UNITED STATES PATENT OFFICE.

R. GOTTGETREU, OF MUNICH, BAVARIA, ASSIGNOR TO LENNIG & CLEMM, OF PHILADELPHIA, PENNSYLVANIA.

MODE OF PRODUCING ETCHING-GROUNDS.

Specification forming part of Letters Patent No. 57,651, dated August 28, 1866.

*To all whom it may concern:*

Be it known that I, R. GOTTGETREU, of the city of Munich, Kingdom of Bavaria, have invented a new Method of Producing Etchings on Copper and Steel Surfaces, for the purpose of printing on paper intended for bank-notes and other securities such ground-work as will render forgery or imitation an impossibility, and which I designate as "Kristallographis."

The nature of my invention is the following: I prepare a solution in water of any readily-crystallizable salt, such as sulphate of magnesia, chromate of potash, &c. Those of a hygroscopic nature must be avoided. A very good solution can be prepared by mixing five volumes of a cold saturated solution of sulphate of magnesia with one volume of cold saturated solution of chromate of potash; (solutions with distilled water.) Such solution should remain undisturbed for several days, and then be filtered. A smooth plate of steel or copper is then coated with a thin layer of this solution, either by immersion or by application with a fine painter's brush, and thus coated left to itself for a few hours in a moderate temperature, when the surface will become covered with a net-work of fine crystals, the distribution of the masses of which depends very much upon the manner in which the coating was applied. The coated plate is then carefully and perfectly covered with absolute alcohol, and when this has evaporated the plate is gently warmed, but not heated, in order still more completely to divest the crystals of watery parts which may not have been removed by the alcoholic application. The plate, after having been thus treated, is coated with a solution of resin, such as rosin or shellac, in alcohol of seventy-eight per cent., the prompt evaporation of which is facilitated by fanning to perfect siccity, the deposited resin arranging itself in conformity with the crystallization; yet this is a very nice operation, being frequently unsuccessful, the resin drying in a uniform surface in lieu of that of the forms of crystallization. After the plate has been perfectly desiccated it is immersed in a bath of distilled water to which some drops of muriatic acid are added. In this the plate must be gently rocked to and fro for some minutes, and then rinsed with pure water, which must be drained off as much as possible, after which the plate is warmed, the heat being gently increased until the resinous coating of the crystals has softened or melted, without, however, losing any part of their sharp distinctness and characteristics, after which, as soon as the plate has become cooled, it is ready for etching in the same manner as usually executed by engravers, and the etchings may range from the most delicate to the darkest tints, after which it is ready for use, the same as any other copper or steel plate.

I need not observe that the whole process is one of great delicacy and skill, requiring considerable practice to produce perfect results.

The designs thus obtained from their very nature it is impossible to reproduce, and the variety and complexness thereof will defy the art of any one to imitate, and by the use of proper colors, such as yellows and blues, photographic copies will be impossible. The process, of course, is only intended for the ground-work of the notes or securities to be printed thereon; but it is of such distinctive character as in itself to be the most perfect preventive of imitation.

What I claim is—

1. The entire process, as afore described, preparatory to etching the design or designs on plates or surfaces of any description, said designs being procured by crystallization of solutions.

2. The process of using crystallizing solutions for the production of images on surfaces that can be etched in the usual method of engravers.

R. GOTTGETREU.

Witnesses:
J. J. T. BAU,
FR. RIEDEL.